United States Patent
Tetlow

(10) Patent No.: US 8,459,061 B2
(45) Date of Patent: Jun. 11, 2013

(54) GRAVITY BENDING GLASS SHEETS

(75) Inventor: Ian Nicholas Tetlow, Tarleton (GB)

(73) Assignee: Pilkington Group Limited, Merseyside (GB)

( * ) Notice: Subject to any disclaimer, the term of this patent is extended or adjusted under 35 U.S.C. 154(b) by 14 days.

(21) Appl. No.: 12/995,222

(22) PCT Filed: Jun. 1, 2009

(86) PCT No.: PCT/GB2009/050598
§ 371 (c)(1),
(2), (4) Date: Jan. 12, 2011

(87) PCT Pub. No.: WO2009/147423
PCT Pub. Date: Dec. 10, 2009

(65) Prior Publication Data
US 2011/0100060 A1 May 5, 2011

(30) Foreign Application Priority Data
Jun. 2, 2008 (GB) .................................. 0810001.8

(51) Int. Cl.
*C03B 23/025* (2006.01)
*C03B 23/027* (2006.01)
(52) U.S. Cl.
CPC ............ *C03B 23/027* (2013.01); *C03B 23/025* (2013.01); *C03B 23/0252* (2013.01)
USPC ............................................. 65/107; 65/290
(58) Field of Classification Search
CPC .... C03B 23/025; C03B 23/0252; C03B 23/027
USPC .......................................... 65/107, 243, 290
See application file for complete search history.

(56) References Cited

U.S. PATENT DOCUMENTS

| | | |
|---|---|---|
| 3,235,350 A | 2/1966 | Richardson |
| 3,281,231 A | 10/1966 | McKelvey et al. |

(Continued)

FOREIGN PATENT DOCUMENTS

| | | |
|---|---|---|
| AU | 41021/89 B | 4/1990 |
| EP | 0 448 447 B1 | 1/1995 |

(Continued)

OTHER PUBLICATIONS

International Search Report (PCT/ISA/210) issued on Aug. 31, 2009, by European Patent Office as the International Searching Authority for International Application No. PCT/GB2009/050598.

(Continued)

*Primary Examiner* — Christina Johnson
*Assistant Examiner* — Cynthia Szewczyk
(74) *Attorney, Agent, or Firm* — Buchanan Ingersoll & Rooney PC

(57) ABSTRACT

A gravity bending mold includes an intermediate mold and a final mold. The final mold comprises a final movable mold section mounted at an end of the mold and the intermediate mold comprises an intermediate movable mold section mounted at the end of the mold adjacent to the final movable section. The final movable mold section is connected via a mechanical linkage to the intermediate mold such that upon moving one of the intermediate mold and the final mold vertically with respect to the other, and at the same time at least one of the intermediate mold and the final mold moves with respect to the mechanical linkage, the gravity bending mold is caused to move between a first arrangement and a second arrangement. There is also provided a method of bending glass sheets using such a mold.

31 Claims, 9 Drawing Sheets

U.S. PATENT DOCUMENTS

| | | | |
|---|---|---|---|
| 3,284,183 A | 11/1966 | Black | |
| 3,325,267 A | 6/1967 | Leflet, Jr. et al. | |
| 5,167,689 A | 12/1992 | Weber | |
| 5,660,609 A | 8/1997 | Muller et al. | |
| 6,076,373 A | 6/2000 | Grodziski | |
| 6,357,263 B1 | 3/2002 | Yajima et al. | |
| 2004/0107729 A1* | 6/2004 | Fukami et al. | 65/25.4 |
| 2009/0199595 A1 | 8/2009 | Machura et al. | |

FOREIGN PATENT DOCUMENTS

| | | |
|---|---|---|
| EP | 0 640 569 A | 3/1995 |
| EP | 0 885 851 A2 | 12/1998 |
| EP | 1 380 547 A1 | 1/2004 |
| EP | 1 380 547 B1 | 8/2005 |
| FR | 1 320 422 A | 3/1963 |
| FR | 2 894 955 A | 6/2007 |
| GB | 956021 A | 4/1964 |
| WO | WO 00/29341 A1 | 5/2000 |
| WO | WO 2008/068527 A1 | 6/2008 |
| WO | WO 2009/074825 A2 | 6/2009 |
| WO | WO 2009074825 A2 * | 6/2009 |

OTHER PUBLICATIONS

Search Report dated Oct. 3, 2008, issued by the United Kingdom Patent Office in the corresponding United Kingdom Patent Application No. GB0810001.8. (3 pages).

Office Action dated May 4, 2011, issued by the European Patent Office in the corresponding European Patent Application No. 09 757 795.1. (5 pages).

* cited by examiner

GRAVITY BENDING GLASS SHEETS

The present invention relates to a gravity bending mould, and to an apparatus for, and a method of, gravity bending glass sheets. In particular the present invention relates to gravity bending of glass sheets, otherwise known as sag bending, in which the glass sheets are supported on a bending mould while being conveyed through a heating lehr of a glass bending furnace.

It is well known to subject glass sheets to gravity bending to shape the glass sheets for forming vehicle windows, for example automotive windows. A single glass sheet may be bent on the gravity bending mould, or two glass sheets may be bent as a stack on the gravity bending mould when the glass sheets are subsequently to be laminated together to form a laminated windscreen. Many modern automotive windows require a high degree of bending curvature at one or more edges or corners. When such a large curvature is introduced into the glass sheet or sheets, this can cause visible imperfections to be introduced into the glass sheets, reducing the optical quality of the glass sheets. Also, it may be difficult to control the bending operation consistently. Furthermore, for some applications there is a need to have a high degree of surface control so that the curved glass surface better matches the design surface. This may also ensure compatibility of a windscreen with existing windscreen wiper systems.

Furthermore, although it is possible to achieve the high degree of curvature using additional forces other than gravity, such as by using a press bending die adapted to press downwardly on the upper surface of the glass sheets, it is desirable to achieve the desired curvature by using only the force of gravity acting on the glass sheets as they soften and are caused to sag to the desired shape defined by the moulds as the sheets pass through the furnace lehr. This is because if an additional press bending die is used then the upper surface of the glass sheet is contacted during the bending operation, which may lead to a reduction in the surface quality of the glass sheets as a result of inadvertent marking of the upper surface by the die, and also the equipment costs are increased. In addition the production rate can be increased by using solely gravity bending as compared to using an additional press bending step.

On a conventional gravity bending mould for bending one or more glass sheets to form a vehicle windscreen, a central portion of the bending mould is static, and two articulated wings are mounted at opposite ends of the central portion. The central portion and the two articulated wings define a peripheral rim which supports the glass sheet or sheets along a peripheral edge of the lower glass surface. The wings are connected to counterweights which apply a rotational force to the wings, tending to rotate the wings upwardly, each about a respective pivot axis, from a substantially horizontal open initial position to a closed bent position in which the rim forms the desired bent shape of the glass sheets.

Initially, the wings are pushed downwardly to the substantially horizontal open initial position and the glass sheet or sheets are placed on the bending mould, whereby the glass sheet or sheets are supported horizontally by the portions of the peripheral rim in the wings. The assembly of the glass sheet or sheets on the gravity bending mould is then passed through a heating lehr. As the glass heats it softens and progressively sags downwardly under gravity, permitting the articulated wings progressively to be rotated upwardly about their respective pivot axes under the action of the counterweights, thereby to close the mould. In the final fully closed position, the glass sheet or sheets are supported around their entire periphery by both the portions of the peripheral rim in the wings and by the portions of the peripheral rim in the central portion.

Sometimes a high degree of curvature is desired to be introduced into the edges or corners of the glass sheets. It is known to employ an auxiliary rim provided adjacent to the rim in the articulated wing. The auxiliary rim is either mounted on the articulated wing, or is part of an auxiliary wing which is mounted to a support for the central portion.

U.S. Pat. No. 5,660,609 discloses a gravity bending mould comprising a rough bending device for supporting a glass sheet about a first periphery line during a first bending phase and a definitive bending device for supporting the glass sheet about a second periphery line during a second bending phase. Transfer of the glass sheet from the first peripheral line to the second peripheral line is performed by positively and continuously regulating a position of at least one of the rough and definitive bending devices in reaction to forces generated on the at least one of the rough and definitive bending devices by contact with the glass sheet.

Known gravity bending moulds of the type described above are not suitable for producing certain types of bent glass to meet current design requirements set by vehicle manufacturers. In particular, for a substantially rectangular windscreen, known gravity bending moulds of the type described above are not suitable for bending the glass to produce a windscreen that has a high degree of curvature in the longitudinal direction (often referred to as "camber" in the art).

The present invention aims at least partially to overcome the problems of these known gravity bending moulds.

Accordingly, the present invention provides from a first aspect a gravity bending mould for bending glass sheets comprising: a final mould having a final peripheral shaping rim and an intermediate mould having an intermediate peripheral shaping rim; the final mould comprising a final movable mould section mounted at an end of the gravity bending mould, the final movable mould section having an upper shaping surface; the intermediate mould comprising an intermediate movable mould section mounted at the end of the gravity bending mould adjacent to the final movable section, the intermediate movable mould section having an upper shaping surface; wherein the gravity bending mould is movable between a first arrangement, wherein the intermediate mould is closed and the upper shaping surface of the intermediate movable mould section is higher than the upper shaping surface of the final movable mould section; and a second arrangement, wherein the final mould is closed and the upper shaping surface of the intermediate movable mould section is lower than the upper shaping surface of the final movable mould section; and wherein, the final movable mould section is connected via a mechanical linkage to the intermediate mould such that upon moving one of the intermediate mould and the final mould vertically with respect to the other, and at the same time at least one of the intermediate mould and the final mould moves with respect to the mechanical linkage, the gravity bending mould is caused to move between the first arrangement and the second arrangement.

By a mould being in an "open position", it is meant that the upper peripheral shaping rim for that mould is not sufficiently complete, such that the mould is not able to shape a sheet of glass to the desired curvature. Accordingly, when the mould is in a "closed position", the upper peripheral shaping rim for that particular mould is complete, or substantially complete, such that the mould is able to shape a sheet of glass to the desired, or substantially desired, curvature.

In a preferred embodiment, the gravity bending mould comprises a fixed mould section that is common to the final mould and the intermediate mould, the fixed mould section having an upper shaping surface that forms part of the intermediate peripheral shaping rim and also part of the final peripheral shaping rim. This provides the advantage of a simple gravity bending mould construction whilst still allowing complex bent glass shapes to be produced, in particular bent glass sheets with a high degree of camber.

Preferably the fixed mould section is mounted on a first support frame and the first support frame is mounted on a mould support frame, such that one of the intermediate mould and final mould is movable vertically with respect to the other by movement of the first support frame in a vertical direction relative to the mould support frame.

Preferably the first support frame is pivotally mounted to the mould support frame.

Preferably the final movable mould section is mechanically linked to the fixed mould section.

In another preferred embodiment, the gravity bending mould comprises an intermediate fixed mould section having an upper shaping surface that forms part of the intermediate peripheral shaping rim and a final fixed mould section having an upper shaping surface that forms part of the final peripheral shaping rim; the intermediate fixed mould section being movable relative to the final fixed mould section, and wherein when the gravity bending mould is in the first arrangement, the upper shaping surface of the intermediate fixed mould section is higher than the upper shaping surface of the final fixed mould section, and when the gravity bending mould is in the second arrangement, the upper shaping surface of the intermediate fixed mould section is lower than the upper shaping surface of the final fixed mould section.

Preferably the intermediate fixed mould section is mounted adjacent to the final fixed mould section.

Preferably the intermediate fixed mould section is mounted on a first support frame and the final fixed mould section is mounted on a second support frame, and wherein a releasable lowering mechanism interconnects the first support frame and the second support frame, adapted selectively and temporarily to dispose the intermediate mould in an initial raised position with respect to the final mould, and when released to cause relative vertical movement between the intermediate and final moulds.

In a most preferred embodiment, the final mould comprises a second final movable mould section mounted at the other end of the gravity bending mould, the second final movable mould section having an upper shaping surface; the intermediate mould comprises a second movable mould section mounted adjacent to the second final movable mould section and having an upper shaping surface, wherein in the first arrangement the upper shaping surface of the second intermediate movable mould section is higher than the upper shaping surface of the second final movable mould section, and wherein the second final movable mould section is connected via a second mechanical linkage to the intermediate mould, such that upon moving from the first arrangement to the second arrangement the second final movable mould section is caused to move into the closed position.

Preferably the second final movable mould section moves into the closed position at the same time as the final movable mould section moves into the closed position.

Embodiments according to the first aspect of the invention may have certain other preferable features.

Preferably the mechanical linkage comprises a link that is rotatable about two pivot axes, for example a universal joint type mounting. By universal joint type mounting, it is meant any connection between a linkage element or link and the mounting that allows the linkage element or link to rotate about more than one pivot axis with respect to the mounting. For example, the universal joint type mounting may be a ball and socket type mounting, or the universal joint type mounting may comprise two substantially perpendicular pivot pins that are one above the other.

Preferably the intermediate mould remains closed during the transition of the gravity bending mould from the first arrangement to the second arrangement.

Preferably the movement of the one of the intermediate mould and the final mould during the transition of the gravity bending mould from the first arrangement to the second arrangement is synchronised with the movement of the final movable mould section into the closed position.

Preferably the final movable end section is articulated.

Preferably the intermediate movable end section is articulated.

Preferably the intermediate mould has a smaller curvature than the final mould.

Preferably the intermediate mould is located inwardly of the final mould.

A gravity bending mould according to the first aspect of the invention is constructed so that the intermediate movable mould section and the final movable mould section are both always in an operable position. This means that the final movable mould section is able to move passed the intermediate movable mould section into the closed position without the need to move the intermediate movable mould section to an inoperable position. An operable position is a position wherein a movable mould section is movable between an open position and a closed position. An inoperable position is a position wherein a movable mould section may be in an open position, but is not movable from the open position to a closed position.

The invention also provides from a second aspect a glass sheet bending apparatus comprising a gravity bending mould according to the first aspect of the invention and a die mechanism arranged to move vertically with respect to the gravity bending mould, the die mechanism comprising a male die for shaping an upper surface of a glass sheet supported on the final peripheral shaping rim.

The invention further provides from a third aspect a glass sheet bending apparatus comprising a plurality of gravity bending moulds according to the first aspect of the invention, a furnace, a conveyor system for successively conveying the plurality of gravity bending moulds through the furnace, the furnace including an actuator mechanism provided inside or outside the furnace at a predetermined location along the furnace length, the actuator mechanism being adapted to cause the gravity bending mould to move from the first arrangement to the second arrangement as each respective gravity bending mould is conveyed past the actuator mechanism.

Preferably the glass sheet bending apparatus comprises a die mechanism arranged to move vertically with respect to one of the gravity bending moulds, the die mechanism comprising a male die for shaping an upper surface of a glass sheet supported on the final peripheral shaping rim.

The invention yet further provides from a fourth aspect a method of gravity bending a glass sheet, the method comprising the steps of: (a) providing a gravity bending mould comprising a final mould having a final peripheral shaping rim and an intermediate mould having an intermediate peripheral shaping rim; the final mould comprising a final movable mould section mounted at an end of the mould, the final movable mould section having an upper shaping surface; the intermediate mould comprising an intermediate movable mould section mounted at the end of the mould adjacent to the final movable mould section; the intermediate movable mould section having an upper shaping surface; the final movable mould section being connected to the intermediate mould via a mechanical linkage; (b) disposing the intermediate mould in a raised position with respect to the final mould; (c) placing a flat glass sheet on the intermediate mould with the intermediate movable mould section being in a substantially horizontal open position, the flat glass sheet being supported by at least one part of the intermediate movable mould section when the intermediate mould is in an open position; (d) gravity bending the flat glass sheet in a furnace by heating the glass sheet, the heating causing softening of the glass sheet thereby to gravity bend the glass sheet, the gravity bending step comprising two phases, (i) a first phase in which the flat glass sheet is bent to an intermediate bent shape by the intermediate mould, such that the bent glass sheet is supported on the intermediate peripheral shaping rim, and (ii) a second phase, after the first phase, in which the final movable mould section is disposed in a raised position with respect to the intermediate movable mould section, and glass sheet is bent from the intermediate bent shape to a final bent shape by closing the final mould, such that the bent glass sheet is supported on the final peripheral shaping rim, wherein in going from the first phase to the second phase, one of the intermediate mould and final mould is moved with respect to the other and at the same time, at least one of the intermediate mould and the final mould moves with respect to the mechanical linkage, to cause the final movable mould section to move upwards relative to the intermediate movable mould section, to take the place of the intermediate movable mould section.

Preferably the intermediate mould is mounted on a first support frame and the first support frame is mounted on a mould support frame, and in going from the first phase to the second phase, the intermediate mould moves by moving the first support frame relative to the mould support frame.

Preferably the first support frame is pivotally mounted to the mould support frame by a hinge mechanism having a pivot axis, and in going from the first phase to the second phase, the first support frame rotates about the pivot axis.

Preferably the movement of the one of the intermediate mould and the final mould is synchronised with the movement of the final movable mould section such that the glass sheet is continually supportable when moving from the first phase to the second phase.

Preferably the method comprises a die assisted bending step for shaping the glass sheet under the action of an applied force when the glass sheet is supported on the final peripheral shaping rim.

Embodiments of the present invention will now be described by way of example only with reference to the accompanying drawings, in which.

Throughout the following description of the above figures, the same or similar reference numerals shall be used to refer to the same part where appropriate.

Figure 1:
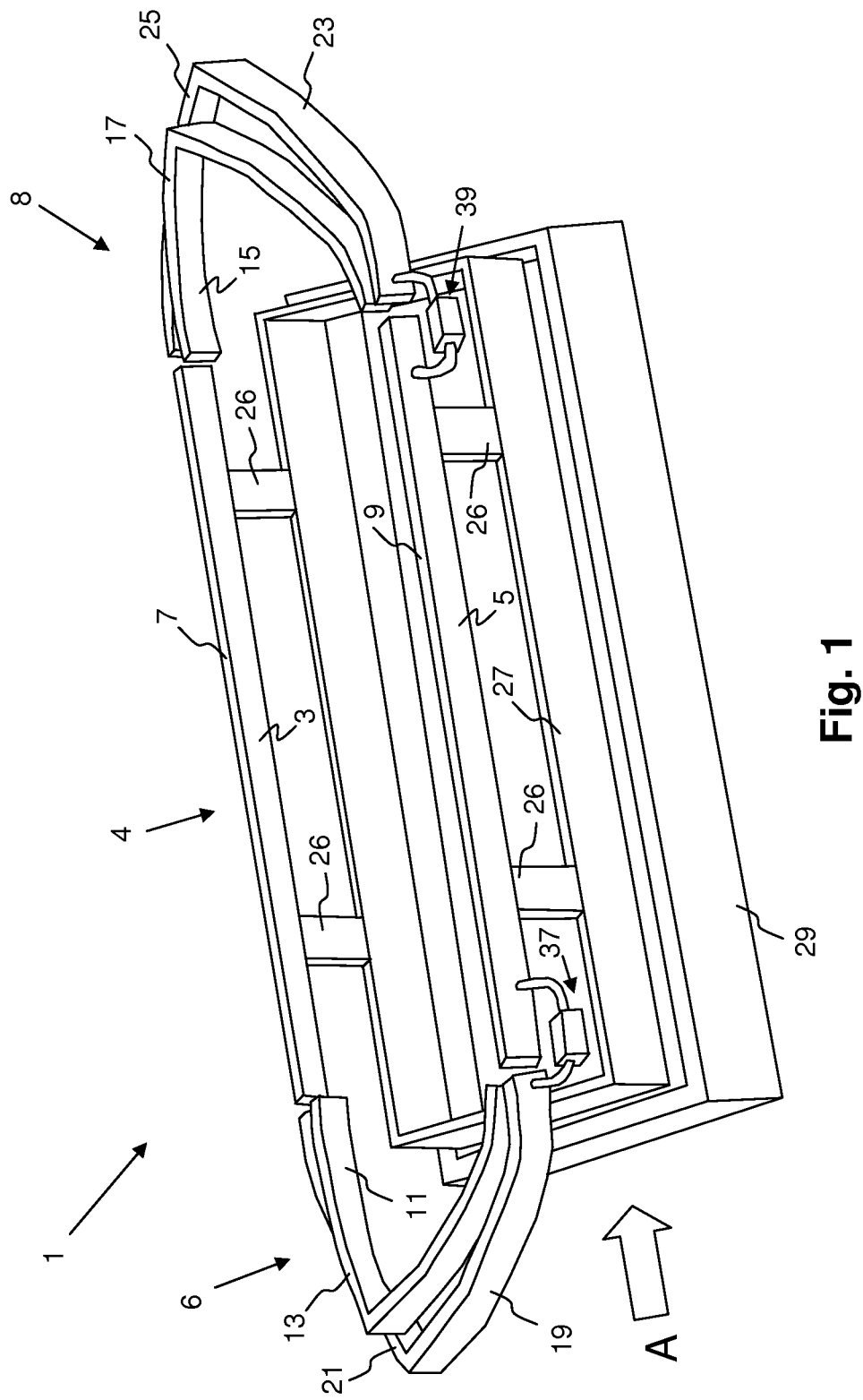
FIG. 1 is a schematic perspective view of part of a mould in accordance with the first aspect of the present invention.

With reference to FIG. 1, there is shown a schematic representation of a gravity bending mould 1 in accordance with the first aspect of the present invention. The gravity bending mould 1 comprises an intermediate mould and a final mould. The intermediate mould has a central portion 4 and two wing portions 6, 8. The central portion 4 comprises two spaced apart fixed mould sections 3 and 5 that may be substantially parallel. Each fixed mould section 3, 5 has a respective upper shaping surface 7, 9 that in the longitudinal direction may be flat or curved (shown as flat in FIG. 1). Mounted at one end of the spaced apart mould sections 3, 5 is an intermediate movable mould section 11 that has an upper shaping surface 13. Mounted at the other end of the spaced apart mould sections 3, 5 is another intermediate movable mould section 15 that has an upper shaping surface 17. The intermediate movable mould sections 11, 15 may be of the same construction or different. The intermediate movable mould sections 11, 15 are movable relative to the spaced apart mould sections 3, 5 between a first position wherein the intermediate mould is in an open position, and a second position wherein the intermediate mould is in a closed position. In this particular embodiment, the movable intermediate mould sections are articulated.

The upper shaping surfaces 7, 9, 13 and 17 form the intermediate peripheral shaping rim of the intermediate mould when the intermediate mould is closed.

The gravity bending mould 1 also comprises a final mould. The final mould comprises the same central portion 4, that is, the two spaced apart fixed mould sections 3, 5, and also two final movable mould sections 19, 23. In this particular embodiment, the final movable mould sections 19, 23 are articulated. The final movable mould section 19 is mounted at one end of the spaced apart mould sections 3, 5 adjacent to the intermediate movable mould section 11. The final movable mould section 23 is mounted at the other end of the spaced apart mould sections 3, 5 adjacent to the intermediate movable mould section 15. The two final movable mould sections 19, 23 may be of the same construction or different. Each final movable mould section 19, 23 has a respective upper shaping surface 21, 25. The final peripheral shaping rim is formed from the upper shaping surfaces 7, 9, 21, 25 when the final mould is closed.

The intermediate mould is mounted on a support frame 27 via legs 26. Since the final mould has the spaced apart mould sections 3, 5 in common, then it is readily apparent to one skilled in the art that for this particular embodiment, the final mould is also mounted on the support frame 27. The support frame 27 is mounted on a mould support frame 29 and is movable in a vertical direction relative thereto. Any suitable mounting to provide vertical movement between the support frame 27 and the mould support frame 29 may be used. Preferably the support frame 27 is pivotally mounted to the mould support frame 29 by a hinge mechanism so that the support frame 27 is rotatable about a pivot axis extending longitudinally from one end of the mould to the other (that is, in the direction of arrow A).

In this particular embodiment the intermediate movable mould sections 11, 15 are located inwardly of the final movable mould sections 19, 23. Moulds built in accordance with the first aspect of the invention may have the or each intermediate movable mould section located outwardly of the respective final movable mould section.

Each movable mould section 19, 23 is connected via a respective mechanical linkage 37, 39 (which are only shown schematically in FIG. 1) to the intermediate mould. In this embodiment, the mechanical linkage 37 connects the fixed mould section 5 to the final movable mould section 19 and the mechanical linkage 39 connects the fixed mould section 5 to the final movable mould section 23. Each mechanical linkage may be connected at one end to the same fixed mould section or a different one.

When the intermediate mould is in the closed position and the final mould is in the open position, the mould 1 is in a first arrangement. Moving the intermediate mould vertically downwards with respect to the final mould causes the intermediate mould to move with respect to the mechanical linkages 37, 39. This in turn causes the mechanical linkages 37, 39 to move from a first configuration to a second configuration, thereby causing the respective final movable mould section 19, 23 to move from a position wherein the final mould is open, to a position wherein the final mould is closed. The mould 1 is then said to be in a second arrangement.

When the mould is in the first arrangement the intermediate mould is closed and the shaping surfaces 13, 17 are above the shaping surfaces 21, 25. When the mould is in the second arrangement, the final mould is closed and the upper shaping surfaces 21, 25 are above the upper shaping surfaces 13, 17. The position of the upper shaping surfaces 7, 9 relative to the mould support frame 29 may be different when the mould is in the first arrangement to when the mould is in the second arrangement. The mould support frame 29 is a fixed point of reference for the gravity bending mould when the gravity bending mould is in the first arrangement and the second arrangement. That is, the intermediate mould and the final mould move relative to the mould support frame 29.

In FIG. 1 the intermediate movable mould sections 11, 15 and the final movable mould section 19, 23 are substantially 'V'-shaped. The movable mould sections 11, 15, 19, 23 may have other configurations, for example they may be 'U'-shaped, 'L' shaped or substantially linear, depending upon the shape of the glass sheet to be bent.

The upper shaping surface of each of the intermediate movable mould sections 11, 15 and the final movable mould section 19, 23 may have a different degree of curvature. In particular, if the movable mould sections 11, 15, 19, 23 are non-linear, for example 'V'-shaped, each respective upper shaping surface 13, 17, 21, 25 may comprise regions of different curvature. For example, if a movable mould section is 'V'-shaped, each leg of the 'V' may have a different degree of curvature, which may be flat.

Figure 2:
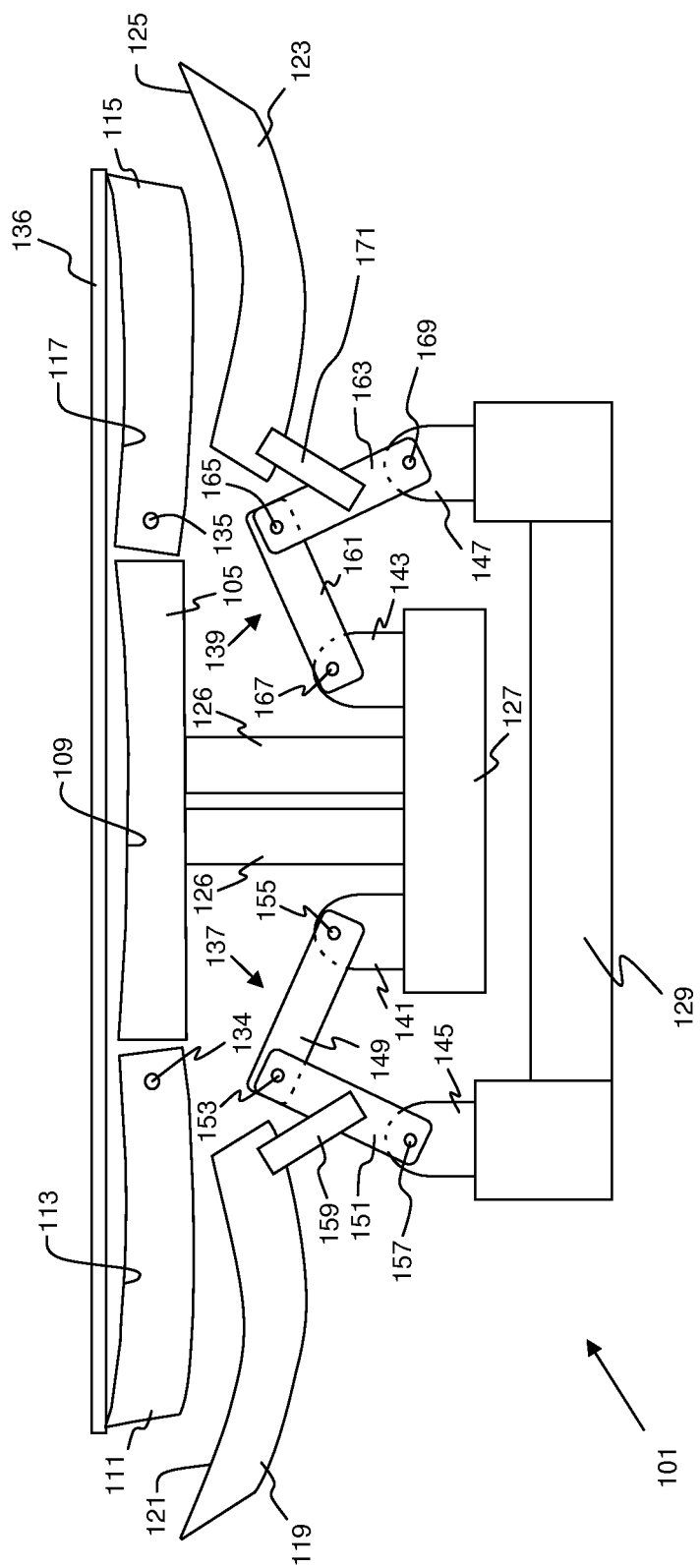
FIG. 2 is a schematic side elevation of another gravity bending mould in accordance with the first aspect of the present invention.

FIG. 2 shows in more detail a side view of a gravity bending mould 101 according to the first aspect of the present invention. This gravity bending mould is essentially the same construction as the gravity bending mould described above for FIG. 1, except each mechanical linkage connects the intermediate mould to the respective final movable mould section via a support frame. That is, the mechanical linkage comprises part of the support frame on which the intermediate mould is mounted. The mechanical linkages are shown in more detail and described below.

The intermediate mould comprises the two spaced apart fixed mould sections 103, 105 (only 105 is shown) and two intermediate movable mould sections 111, 115. Each intermediate movable mould section 111, 115 has a respective upper shaping surface 113, 117. The intermediate mould is mounted on support frame 127.

The intermediate mould is shown in a raised position with respect to both the final mould and the mould support frame 129. Since the intermediate mould is mounted on a support frame 127 via legs 126, the support frame 127 is also in a raised position with respect to the mould support frame 29. The support frame 127 is disposed in the raised position by a releasable lowering mechanism (not shown) interconnecting the support frame 127 and the mould support frame 129. Each intermediate movable mould section 111, 115 is rotatable between an open position and a closed position about a respective pivot 134, 135. The intermediate movable mould sections 111, 115 are shown in an open position relative to the fixed mould sections 103, 105 (only mould section 105 is shown). The intermediate movable mould sections 111, 115 are articulated in this particular embodiment.

A flat sheet of glass 136 is shown supported on the lateral edge portions of the intermediate movable mould sections 111, 115. In this particular embodiment, the spaced apart fixed mould section 105 is shown having a curved upper shaping surface 109 in the longitudinal direction. The other intermediate mould section 103 (not shown) may have an upper shaping surface 107 having the same degree of curvature as the upper shaping surface 109 or a different degree of curvature.

Each intermediate movable mould section 111, 115 has a respective upper shaping surface 113, 117.

The final mould comprises the two spaced apart fixed mould sections 103, 105 (only 105 is shown) and the final movable mould sections 119, 123. Each final movable mould section 119, 123 has a respective upper shaping surface 121, 125. A portion of the final mould is mounted on the support frame 127. Another portion of the final mould is mounted on the mould support frame 129.

The intermediate mould is in mechanical communication with the two final movable mould sections 119, 123 via respective mechanical linkages 137, 139.

The mechanical linkage 137 comprises a first link 149 and a second link 151 pivotally connected at one end via pivot pin 153. The other end of the first link 149 is pivotally connected to the pivot mount 141 via pivot pin 155. The other end of the second link 151 is pivotally connected to the pivot mount 145 via pivot pin 157. A link element 159 extends from the second link 151 and connects the second link 151 to the final movable mould section 119.

The mechanical linkage 139 comprises a first link 161 and a second link 163 pivotally connected at one end via pivot pin 165. The other end of the first link 161 is pivotally connected to the pivot mount 143 via pivot pin 167. The other end of the second link 163 is pivotally connected to the pivot mount 147 via pivot pin 169. A link element 171 extends from the second link 163 and connects the second link 163 to the final movable mould section 123.

In this particular embodiment, each mechanical linkage 137, 139 is connected to the support frame 127 via respective pivot mounts 141, 143. Similar pivot mounts 145, 147 are connected to the mould support frame 129. It will be readily apparent to one skilled in the art that in this particular embodiment the mechanical linkage that connects the intermediate mould to the final movable mould section comprises mechanical linkage 137 (or 139), a portion of the support frame 127, pivot mount 141 (or 143) and legs 126. In a variation to this embodiment, the end of mechanical linkage 137, 139 that is shown connected to pivot mount 141, 143 may be suitably connected directly to either of the fixed mould sections. Alternatively, the end of mechanical linkage 137, 139 that is shown connected to pivot mount 141, 143 may be suitably connected directly to either of the intermediate movable mould sections.

There is a releasable lowering mechanism (not shown) interconnecting the support frame 127 and the mould support frame 129. When primed, the releasable lowering mechanism disposes the support frame 127 in a raised position relative to the mould support frame 129.

Figure 3:
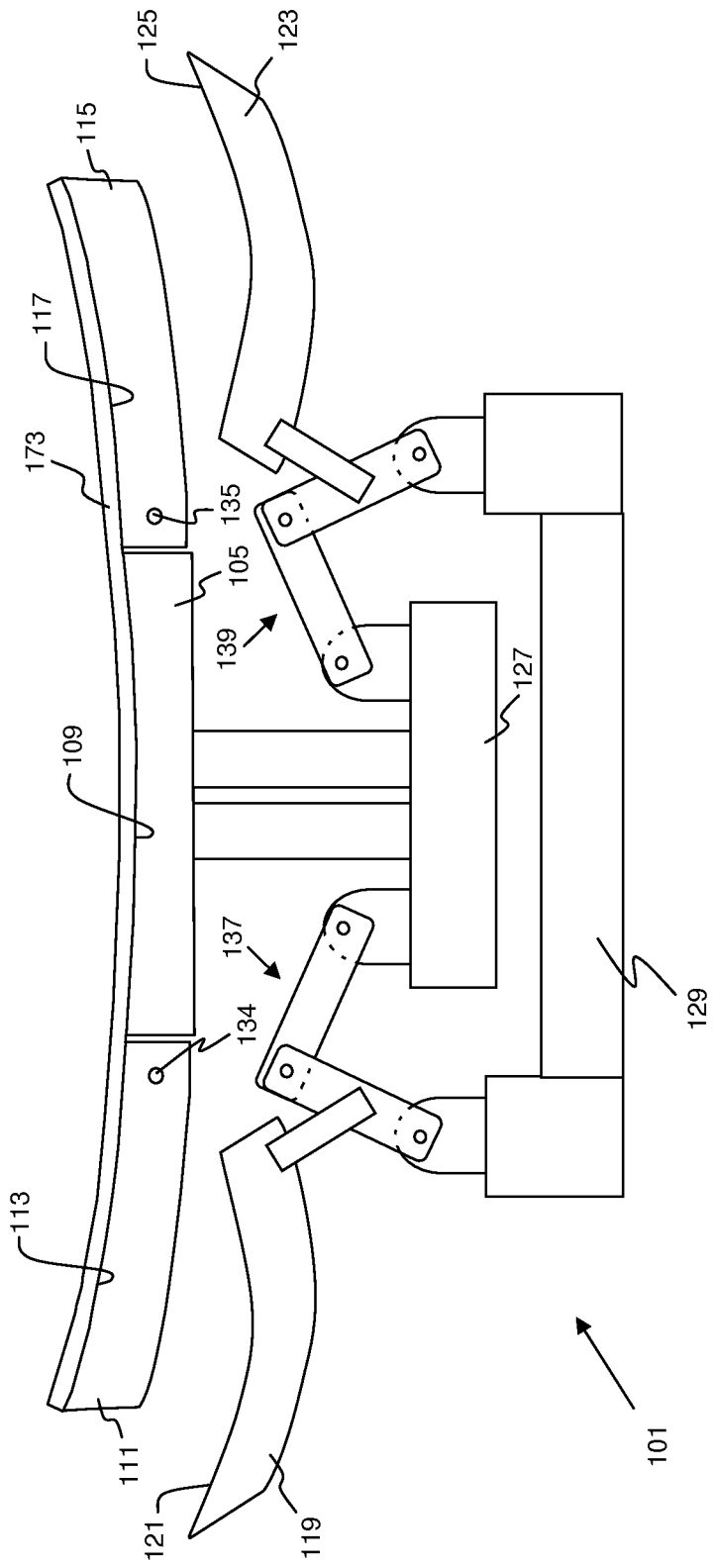
FIG. 3 is a schematic side elevation of the gravity bending mould of FIG. 2, wherein the gravity bending mould is shown in a first arrangement.

FIG. 3 shows the intermediate mould in the closed position and the final mould in the open position. The gravity bending mould 101 is shown in the first arrangement. The intermediate movable mould sections 111, 115 are shown having been rotated about their respective pivots 134, 135 so that the intermediate mould is in the closed position. The upper shaping surfaces 113, 117 of the intermediate movable mould sections 111, 115 and the upper shaping surfaces 107, 109 of the mould sections 103, 105 form the peripheral shaping rim of the intermediate mould. Fixed mould section 103 is not shown in this figure.

A bent glass sheet 173 having an intermediate curvature is shown supported on the peripheral rim of the intermediate mould in the closed position. There has been no relative movement, either vertically or horizontally, between the support frame 127 and the mould support frame 129. The mechanical linkages 137, 139 are in the same configuration in FIG. 3 as they were in FIG. 2.

Figure 4:
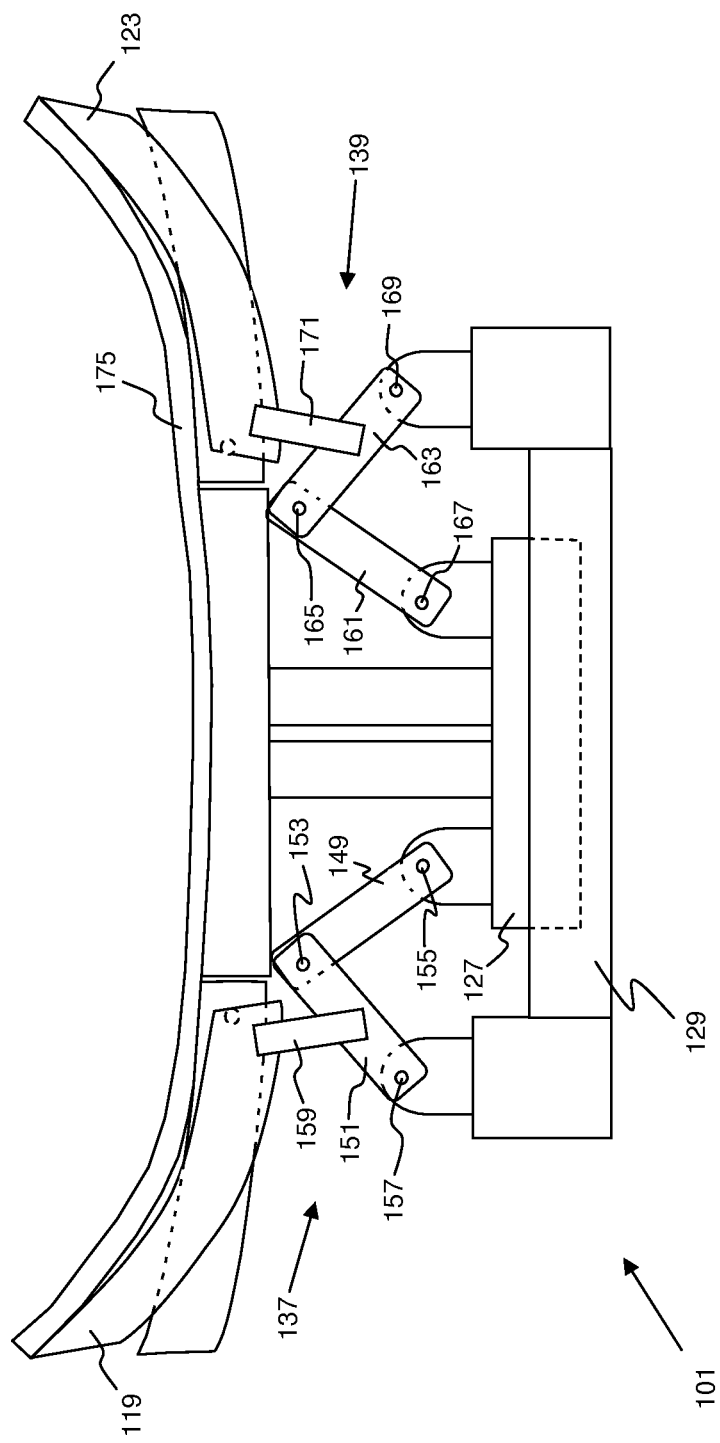
FIG. 4 is a schematic side elevation of the gravity bending mould of FIG. 2, wherein the gravity bending mould is shown during the transition from the first arrangement to a second arrangement.
Figure 5:
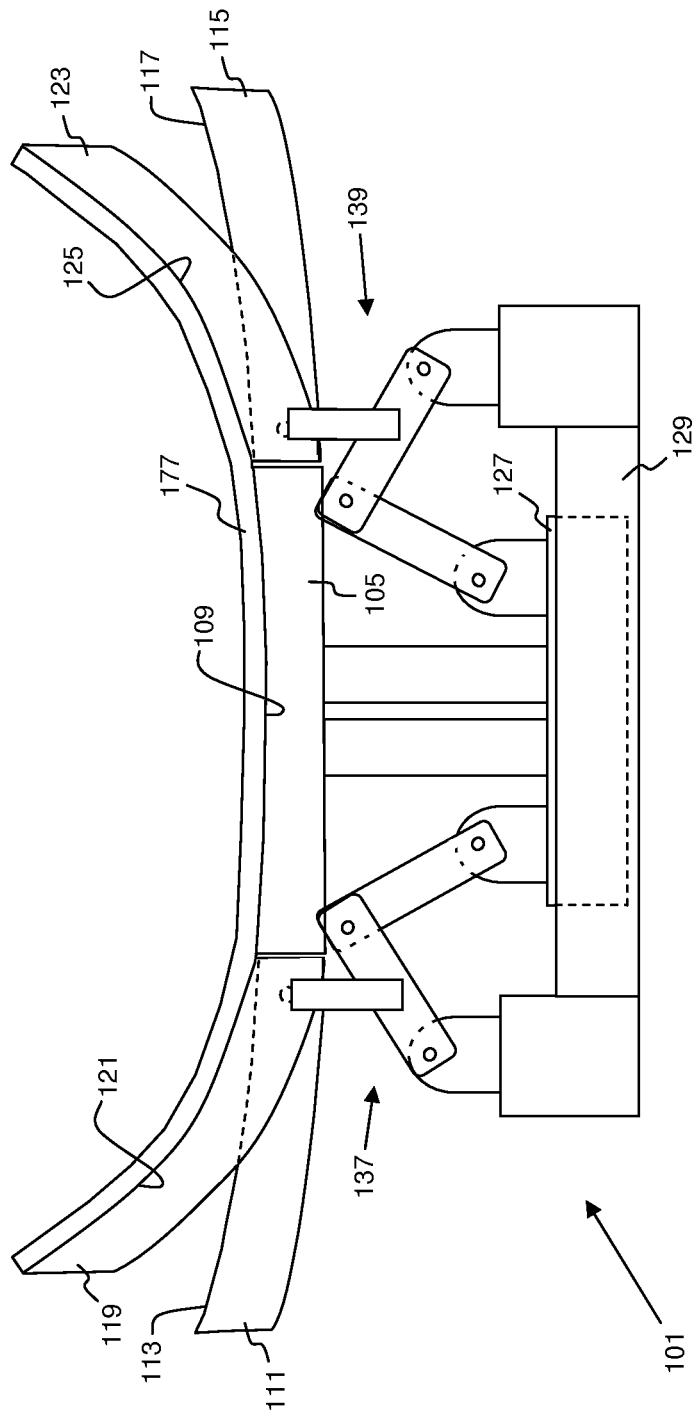
FIG. 5 is a schematic side elevation of the gravity bending mould of FIG. 2, wherein the gravity bending mould is shown in the second arrangement.

In FIG. 4 the mould 101 is shown during the transition from the first arrangement shown in FIG. 3 and the second arrangement shown in FIG. 5.

The releasable lowering mechanism (not shown) has been actuated causing the support frame 127 to fall vertically downwards under the action of gravity towards the mould support frame 129. The intermediate mould has moved vertically downwards with respect to the final mould and at the same time both the final mould and the intermediate mould have moved with respect to the mechanical linkages 137, 139. The downward vertical movement may be assisted by, or may be provided by, linear actuators.

The vertical downward movement of the intermediate mould supported on support frame 127 causes link 149 to rotate in a clockwise direction about pivot pin 155. Since link 149 is pivotally connected to link 151 via pivot pin 153, clockwise rotation of link 149 about pivot pin 155 causes link 151 to rotate in a clockwise direction about pivot pin 157. The final movable mould section 119 is therefore caused to move into the closed position because the final movable mould section is mechanically connected to the link 151 via link element 159.

The vertical downward movement of the intermediate mould supported on support frame 127 also causes link 161 to rotate in an anticlockwise direction about pivot pin 167. Since link 161 is pivotally connected to link 163 via pivot pin 165, anticlockwise rotation of link 161 about pivot pin 167 causes link 163 to rotate in an anticlockwise direction about pivot pin 169. The final movable mould section 123 is therefore caused to move into the closed position because the final movable mould section 123 is mechanically connected to the link 163 via link element 171.

Since the mechanical linkages 137, 139 are pivotally mounted at one end to the static mould support frame 129 and at the other end to the support frame 127, the downward vertical movement of the support frame 127 relative to the mould support frame 129 causes the mechanical linkages 137, 139 to move in synchronisation. The movement of the final movable mould sections 119, 123 into the closed position is therefore synchronised with each other and also with the downward movement of the support frame 127 (and hence the intermediate mould). This has the advantage of providing a symmetrical bending action for both the left hand side and the right hand side of the final mould, resulting in better, more uniform optics of the final bent glass sheet.

Additional synchronisation means may be provided to assist the closing of the final mould, for example, linear actuators or suitably mounted counterweights may be provided for one or both final movable mould sections.

The gravity bending mould 101 is suitably constructed such that by moving the intermediate mould in the closed position vertically downwards with respect to the final movable mould section 119, 123 (and hence the final movable mould), a bent sheet of glass supported on the intermediate peripheral shaping rim may be constantly supported during the transition of the gravity bending mould from the first arrangement to the second arrangement. At the beginning of the transition of the gravity bending mould from the first arrangement to the second arrangement, the bent glass sheet is initially supported only by the peripheral shaping rim of the intermediate mould in the closed position. During the transition of the gravity bending mould from the first arrangement to the second arrangement, the bent glass sheet 175 is supportable on a peripheral rim comprised of portions of both the intermediate peripheral rim and the final peripheral rim. This is a transient peripheral rim. At the end of the transition of the gravity bending mould from the first arrangement to the second arrangement, the bent glass sheet is supported only by the peripheral shaping rim of the final mould in the closed position.

The transition between the first arrangement and the second arrangement may occur sufficiently quickly that the bent glass sheet does not have time to fully sag under gravity to contact the transient peripheral rim at all points.

It should be readily apparent to one skilled in the art that FIG. 4 shows the gravity bending mould in a transient arrangement that is in between the first arrangement and the second arrangement.

In FIG. 5, the mould 101 is shown in the second arrangement. The intermediate mould is shown in a lowered position relative to the supporting framework 129 because the support frame 127 has been lowered by releasing the releasable support mechanism (not shown). As the intermediate mould is lowered, the final movable mould sections 119, 123 are moved into the closed position such that the upper shaping surfaces 121, 125 are above the upper shaping surfaces 113, 117. The movement of the two final mould sections 119, 123 into the closed position is synchronised because the mechanical linkages 137, 139 are in mechanical communication with the support frame 127 at one end, and in mechanical communication with the static mould support frame 129 at the other end. By having identical, or substantially identical, mechanical linkages, the movement of the two final movable mould sections 119, 123 may be synchronised.

With the final movable mould sections in the closed position as shown in FIG. 5, the upper shaping surfaces 121, 125 and the upper shaping surfaces 107, 109 of the mould sections 103, 105 form the peripheral shaping rim of the final mould. Note that only mould section 105 is shown in the figure, but the mould is of a similar construction to the mould shown in FIG. 1. A bent sheet of glass 177 having the final desired curvature is shown supported on the peripheral rim of the final mould.

Figure 6:
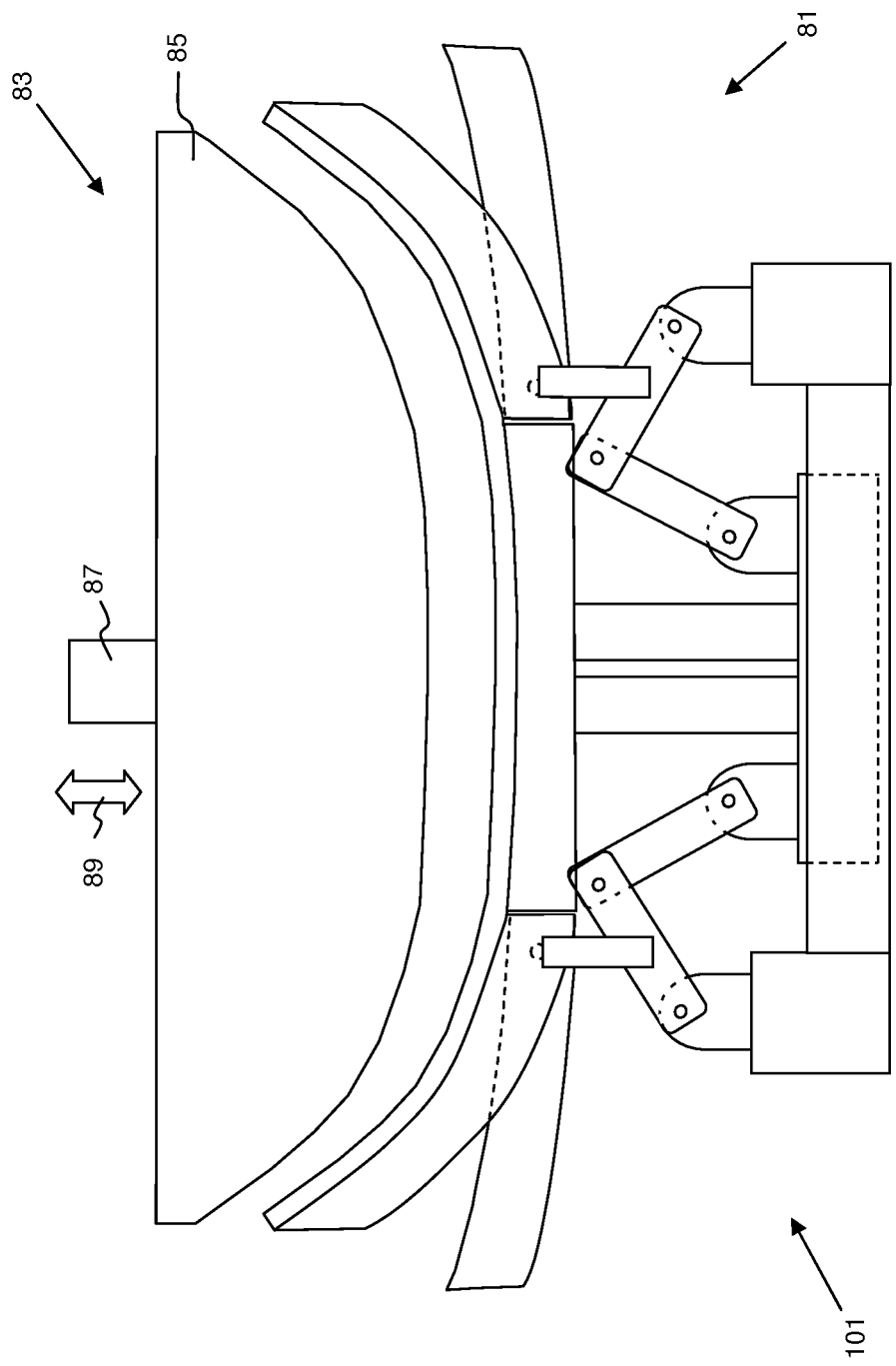
FIG. 6 is a schematic side elevation of the gravity bending mould of FIG. 2, wherein the gravity bending mould is shown in the second arrangement and a die mechanism is located above the gravity bending mould.

In FIG. 6 a glass bending apparatus 81 is shown comprising the gravity bending mould 101 as shown in FIG. 5 and a die mechanism 83. The die mechanism 83 comprises a male die 85 and a linear actuator mechanism 87 for moving the die 85 vertically up and down in the direction of arrow 89. The die mechanism may be used to provide an additional bending force other than that of gravity and may be useful to produce certain desired bent glass shapes that are difficult to produce by gravity bending alone. The die may be used to bend the glass sheet when supported on the final peripheral shaping rim.

When a die mechanism is used, the closing of the final mould may be synchronised with the downwards movement of the male die. Additional synchronisation means to synchronise the downwards movement of the male die and the closing of the final mould may be provided to assist the closing of the final mould, for example, linear actuators or suitably mounted counterweights.

Figure 7:
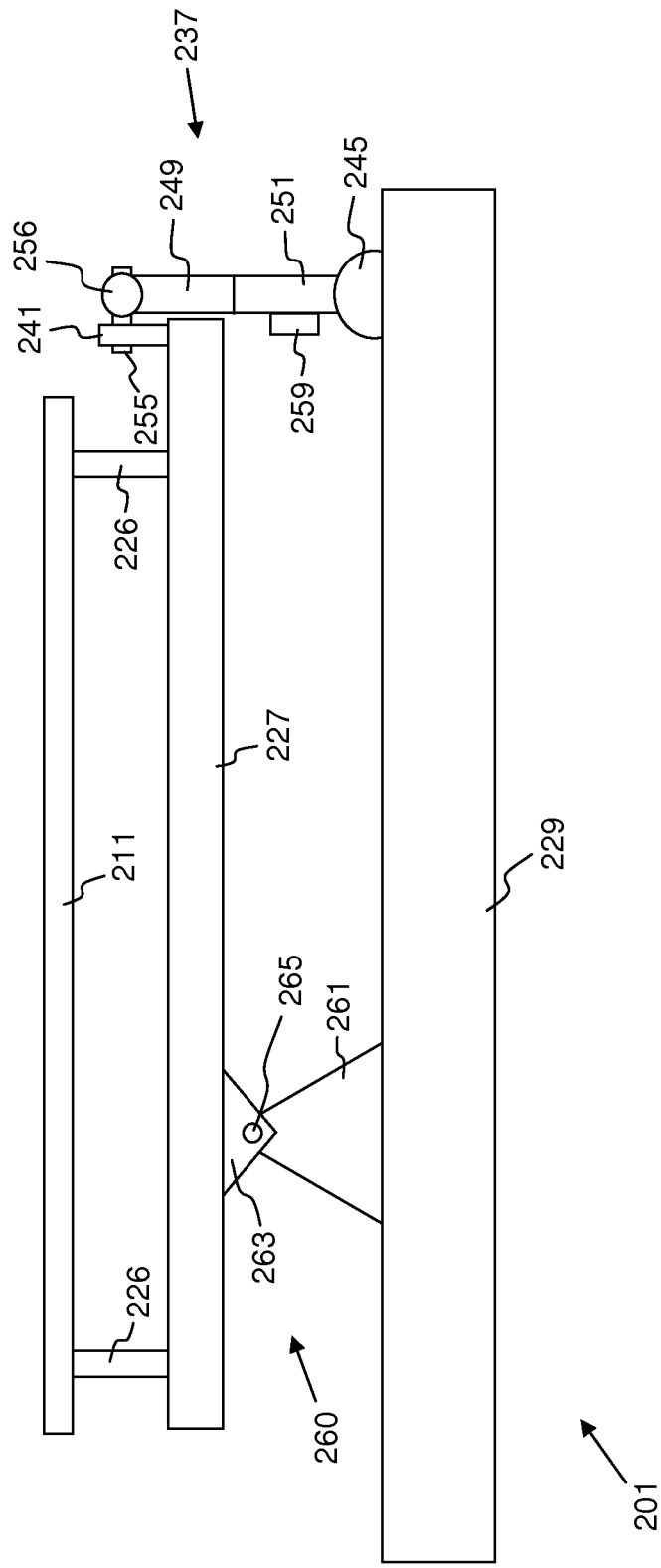
FIG. 7 is a schematic side elevation of another gravity bending mould in a first arrangement showing a mechanism for allowing intermediate mould to move vertically with respect to the final mould.

FIG. 7 shows a schematic end view of a gravity bending mould 201 of similar construction to that shown in FIG. 1. The gravity bending mould 201 is viewed in the direction of arrow A in FIG. 1. The gravity bending mould 201 is also of a similar construction to the gravity bending 101 mould described previously. FIG. 7 (and FIG. 8) illustrates one particular way of moving the intermediate mould vertically downwards with respect to the final mould.

In this figure the final mould is not shown for clarity. The intermediate mould comprises an intermediate movable section 211 mounted at an end of the mould. The intermediate mould is mounted on a support frame 227 via legs 226. The support frame 227 is mounted to mould support frame 229 by a hinge assembly 260. The hinge assembly comprises a first hinge member 261 connected to mould support frame 229 and a second hinge member 263 connected to support frame 227. The hinge members 261, 263 are pivotally connected by a pivot pin 265 so that the support frame 227 is rotatable relative to the mould support frame 229 about pivot pin 265. There may be more than one hinge assembly, for example at each end of the mould, that is, at ends 6 and 8 as indicated in FIG. 1.

The gravity bending mould 201 shown in FIG. 7 is in a first arrangement. A releasable lowering mechanism (not shown) interconnects the support frame 227 and the mould support frame 229.

There is a mechanical linkage 237 that connects the intermediate mould to a final movable mould section (not shown). Note that the mechanical linkage 237 is connected to the intermediate mould via support frame 227 and legs 226. As has been described above, this is one particular way of connecting a final movable mould section to the intermediate mould.

The mechanical linkage 237 comprises a ball and socket type mounting 245 connected to the mould support frame 229. A link 251 extends from the ball and socket type mounting 245. The link 251 is able to rotate about two substantially perpendicular pivot axes.

The other end of link 251 is pivotally connected to link 249. The other end of link 249 is mounted to another ball and socket type mounting 256. A pin 255 extends through the ball and socket type mounting and is arranged to pivot about pivot mount 241 mounted on support frame 227. A link element 259 is connected to link 251, and connects the link 251 to the final movable mould section (not shown). The ball and socket type mounting is one way of providing a universal joint type mounting.

Figure 8:
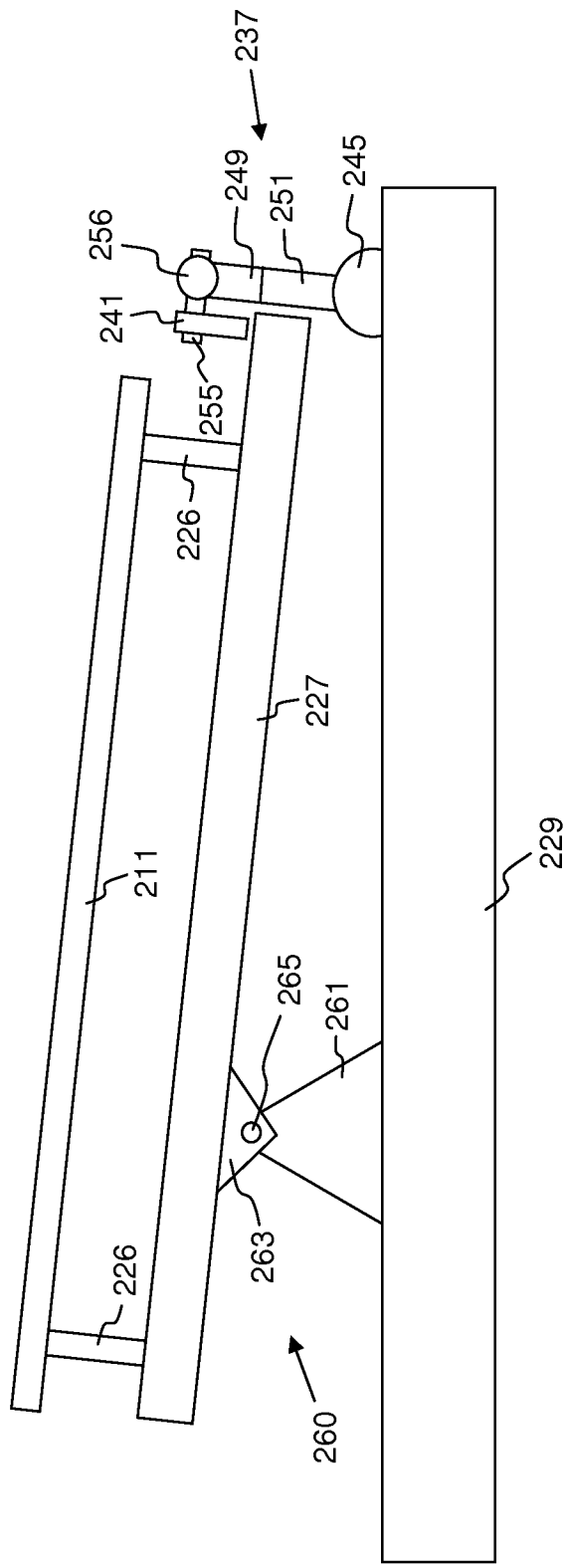
FIG. 8 is a schematic side elevation of the gravity bending mould shown in FIG. 7 wherein the intermediate mould has moved vertically with respect to the final mould such that the gravity bending mould is in a second arrangement.

FIG. 8 shows the gravity bending mould 201 in a second arrangement. The releasable lowering mechanism (not shown) that interconnects the support frame 227 and the mould support frame 229 has been released. The support frame 227, under the action of gravity, rotates about the pivot pin 265 thereby causing the intermediate mould to move vertically downwards towards the mould support frame 229. This downward vertical movement causes the final mould to close in a similar manner to that described with reference to FIGS. 4 and 5.

Since the support frame 227 rotates about the pivot pin 265, the mechanical linkage must be able to accommodate the horizontal displacement of the support frame 227. This is achieved by the ball and socket type mountings 245, 256. The link elements 249, 251 rotate as described with reference to FIGS. 4 and 5, but in addition the link elements are rotatable about another pivot axis to accommodate the horizontal displacement of the support frame 227. The ball and socket type mounting may be replaced by any type of mounting that provides this type of dual pivot axes for the links 249 and 251, for example a pair of perpendicularly disposed pivot pins one above the other.

Other ways of achieving movement of one of the intermediate mould and the final mould vertically with respect to the other, and at the same time at least one of the intermediate mould and the final mould moves with respect to the mechanical linkage may be used, for example linear actuators.

It will be readily apparent to one skilled in the art that gravity bending moulds in accordance with the first aspect of the invention may have no central mould sections, in which case the intermediate movable mould sections would be mounted opposite each other with no intervening mould sections. Also it will be readily apparent to one skilled in the art that the intermediate mould and the final mould may not have any mould sections in common, in which case the intermediate mould may be supported on an intermediate support frame and the final mould may be supported on a final support frame. In such an embodiment, there may be a mechanical linkage between the intermediate mould, which may be via the intermediate support frame, and a final movable mould section such that moving one of the intermediate mould and final mould vertically with respect to the other, and at the same time at least one of the intermediate mould and the final mould moves with respect to the mechanical linkage, the gravity bending mould is caused to move between the first arrangement and the second arrangement, thereby causing the final movable mould section to move from an open position to a closed position.

In a further modification, each of the intermediate mould and the final mould may only have a single movable section, mounted adjacent to each other, at one end of the mould.

The bending operation will now be described.

With reference to FIGS. 2 to 5, initially a flat glass sheet 136 is placed on the intermediate mould with the intermediate movable mould sections 111, 115 in the raised, substantially horizontal position. A releasable lowering mechanism (not shown) is primed so that the support frame 127 (and therefore the intermediate mould) is disposed in a raised position with respect to the final mould (and the mould support frame 129). The intermediate movable mould sections 111, 115 are disposed in a substantially horizontal position and held in this position by the weight and rigidity of the flat glass sheet 136.

As is conventional in the art, a stack of glass sheets, for example a pair of glass sheets, separated by a suitable separating agent such as calcium carbonate, may be bent at the same time.

The assembly of glass sheet 136 and gravity bending mould 101 is heated in a conventional heating furnace or lehr. As the glass is heated, it softens and loses its rigidity. Each of the intermediate mould sections 111, 115 can therefore progressively rotate into the closed position about the respective pivot 134, 135, usually under the influence of a counterweight (not shown) connected thereto. The glass sheet is bent to an intermediate shape 173 on the intermediate mould in the closed position. With reference to FIG. 3, the glass sheet 173 is supported on the peripheral shaping rim of the intermediate mould. The gravity bending mould is then in a first arrangement.

At a particular time, the releasable lowering mechanism may be tripped by a suitable actuator mechanism. When the releasable lowering mechanism is released, the support frame 127 moves vertically downwards with respect to the final mould (and the mould support frame 129). Since the support frame is in mechanical communication with the final movable mould section 119, 123 via respective mechanical linkage 137, 139, the vertical movement of the support frame (and hence the intermediate mould in the closed position) causes the final movable mould sections 119, 123 to rotate into the closed position.

The gravity bending mould 101 in the first arrangement has the upper shaping surface 121, 125 of the respective final movable mould section 119, 123 below the upper shaping surface 113, 117 of the respective adjacent intermediate movable mould section 111, 115. As the support frame 127 is lowered, the bent glass sheet 173 is continually supported by at least a portion of the upper shaping surface 113, 117 as the final movable mould section 119, 123 rotates passed the respective intermediate movable mould section 111, 115 to take the place thereof.

As the final movable mould section 119, 123 rotates passed the respective intermediate movable mould section 111, 115 the glass sheet is supported by a portion of the upper shaping surface 113, 117 and a portion of the upper shaping surface 121, 125. When the final movable mould sections 119, 123 have moved into the closed position, the glass sheet in the wing portion is bent to the final shape and the glass sheet in the wing portion is supported on the upper shaping surfaces 121, 125 of the respective final movable mould section 119, 123. The glass sheet remains supported throughout the bending operation so that reverse bending is not possible. The glass sheet being supported on the final peripheral shaping rim is shown as 177 in FIG. 5.

When the releasable lowering mechanism has been released, each mechanical linkage 137, 139 moves from a first configuration as shown in FIGS. 2 and 3, to a second configuration as shown in FIG. 5.

Figure 9:
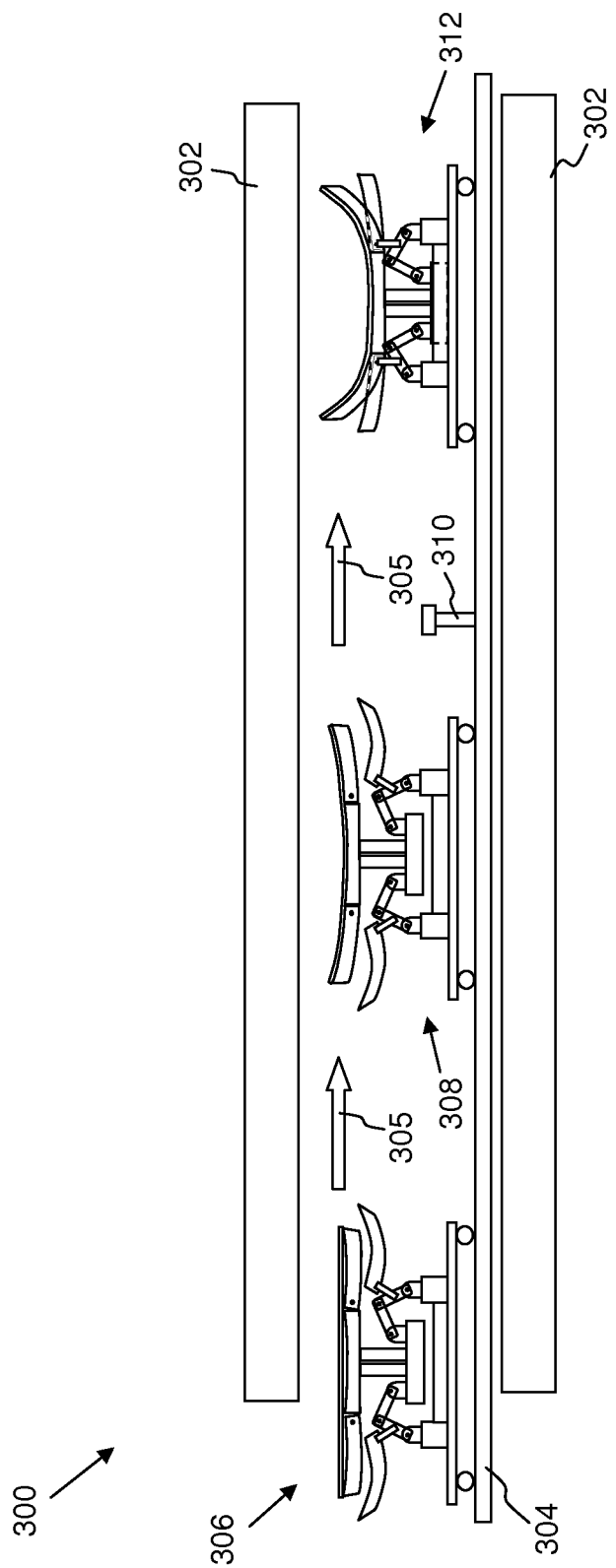
FIG. 9 is a schematic side elevation of a plurality of the gravity bending moulds passing through a furnace for bending glass sheets in accordance with the present invention.

A schematic representation of a glass sheet bending apparatus 300 according to the fourth aspect of the invention is shown in FIG. 9. The glass sheet bending apparatus 300 comprises a plurality of gravity bending moulds according to the first aspect of the invention (of the type described with reference to FIGS. 2-5). The glass sheet bending apparatus 300 comprises a heating furnace or lehr 302 and a conveyor system 304 for conveying the gravity bending moulds through the heating furnace in the direction of arrows 305. An assembly of glass sheet and bending mould 306 is passed through the heating furnace 302. As the glass heats, it softens and progressively sags downwardly under gravity, permitting the intermediate movable mould sections progressively to be rotated upwardly about the respective pivot axis, which may be under the action of a counterweight, thereby progressively to bend the glass sheet and close the intermediate mould. The mould is then in a first arrangement, as shown at 308.

After the desired intermediate curvature has been introduced into the glass sheet, at a particular time or location in the heating furnace, the releasable lowering mechanism that interconnects the support frame and the mould support frame can be actuated using actuator 310 to cause the support frame to drop vertically towards the mould support frame. The actuator 310 may be inside or outside of the heating lehr.

As the support frame and intermediate mould drop under the action of gravity, due to the mechanical linkage between the intermediate mould and the final movable mould sections, the final movable mould sections are urged upwards, thereby rotating into the closed position shown at 312. The mould is then in a second arrangement. At all times during the bending operation the glass sheet is supported in the lateral edges.

Initially the bent glass sheet is supported only on the intermediate peripheral rim. When the mould moves from the first arrangement to the second arrangement, the final movable mould sections pass the intermediate movable mould sections to take the place thereof, thereby lifting the glass off the intermediate movable mould sections. Until the final mould closes, the glass sheet is partially supported in the lateral edges by a portion of the upper shaping surfaces of the intermediate movable mould sections and by a portion of the upper shaping surfaces of the final movable mould sections. Since the final movable mould sections have a higher degree of curvature than the intermediate movable mould sections, the glass sheet continues to sag until the bottom of the glass sheet contacts the shaping surface of the final movable mould section. The glass sheet has then been bent to the desired final shape.

When the intermediate mould is lowered, because the final movable mould sections are both in mechanical communication with the intermediate mould via substantially the same type of mechanical linkage, the final movable mould sections rotate at the same time into the closed position. This provides the advantage that the movement of the final movable mould sections is synchronised which allows an improved control over the shaping of the glass to the final desired shape.

This completes the bending operation. The mould and bent glass thereon pass through the remainder of the heating furnace 302, undergoing a conventional annealing and cooling schedule. After the bending mould exits the furnace, the bent glass sheet is removed from the bending mould and allowed to cool. The bending mould is returned to the entrance of the furnace, the releasable lowering mechanism primed and the mould loaded with a glass sheet for a subsequent bending cycle.

In an alternative to FIG. 9, the assembly of glass sheet and bending mould shown at 306, 308 and 312 may be disposed at 90° to the orientation shown in FIG. 9 when the assembly of glass sheet and bending mould travel through the lehr in the direction of the arrows 305.

In a further embodiment, the bending operation may include a press bending step by suitably locating a die mechanism in the heating lehr. The die mechanism may be used to press bend the already bent glass sheet to achieve additional curvature in regions that may not be adequately bent by gravity bending alone when the glass is supported on the final peripheral shaping rim.

The present invention has particular application in the manufacture of vehicle windscreens for which a high degree of curvature is desired to be introduced into the edges or corners of the glass sheets.

The embodiments of the present invention provide the technical advantage that movement of the final movable mould sections may be synchronised such that there is better control of the glass bend in the lateral edges or corners of the glass sheet. In particular, when there are two opposed final movable mould sections, the movement of each final movable mould section may be synchronised because of the mechanical linkage between each final movable mould section and the intermediate mould. Additionally, the glass sheet may be supported throughout the entire bending operation which results in better optics. The final bent glass shape is more uniform because each wing portion may be bent at the same time, thereby reducing the potential for movement of the glass sheet on the mould and the potential for reverse bending.

The invention claimed is:

1. A gravity bending mould for bending glass sheets comprising: a final mould having a final peripheral shaping rim and an intermediate mould having an intermediate peripheral shaping rim; the final mould comprising a final movable mould section mounted at an end of the gravity bending mould, the final movable mould section having an upper shaping surface; the intermediate mould comprising an intermediate movable mould section mounted at the end of the gravity bending mould adjacent to the final movable section, the intermediate movable mould section having an upper shaping surface;
wherein the gravity bending mould is movable between a first arrangement, wherein the intermediate mould is closed and the upper shaping surface of the intermediate movable mould section is higher than the upper shaping surface of the final movable mould section; and a second arrangement, wherein the final mould is closed and the upper shaping surface of the intermediate movable mould section is lower than the upper shaping surface of the final movable mould section;
wherein the final movable mould section is connected via a mechanical linkage to the intermediate mould such that upon moving one of the intermediate mould and the final mould vertically with respect to the other, and at the same time at least one of the intermediate mould and the final mould moves with respect to the mechanical linkage, the gravity bending mould is caused to move between the first arrangement and the second arrangement; and
wherein the entire upper shaping surface of the intermediate movable mould section is located inwardly or outwardly of the upper shaping surface of the final movable mould section.

2. A gravity bending mould according to claim 1, comprising a fixed mould section that is common to the final mould and the intermediate mould, the fixed mould section having an upper shaping surface that forms part of the intermediate peripheral shaping rim and also part of the final peripheral shaping rim.

3. A gravity bending mould according to claim 2, wherein the fixed mould section is mounted on a first support frame and the first support frame is mounted on a mould support frame, such that one of the intermediate mould and final mould is movable vertically with respect to the other by movement of the first support frame in a vertical direction relative to the mould support frame.

4. A gravity bending mould according to claim 3, wherein the first support frame is pivotally mounted to the mould support frame.

5. A gravity bending mould according to claim 2, wherein the final movable mould section is mechanically linked to the fixed mould section.

6. A gravity bending mould according to claim 1, comprising an intermediate fixed mould section having an upper shaping surface that forms part of the intermediate peripheral shaping rim and a final fixed mould section having an upper shaping surface that forms part of the final peripheral shaping rim; the intermediate fixed mould section being movable relative to the final fixed mould section, and wherein when the gravity bending mould is in the first arrangement, the upper shaping surface of the intermediate fixed mould section is higher than the upper shaping surface of the final fixed mould section, and when the gravity bending mould is in the second arrangement, the upper shaping surface of the intermediate fixed mould section is lower than the upper shaping surface of the final fixed mould section.

7. A gravity bending mould according to claim 6, wherein the intermediate fixed mould section is mounted adjacent to the final fixed mould section.

8. A gravity bending mould according to claim 6, wherein the intermediate fixed mould section is mounted on a first support frame and the final fixed mould section is mounted on a second support frame, and wherein a releasable lowering mechanism interconnects the first support frame and the second support frame, adapted selectively and temporarily to dispose the intermediate mould in an initial raised position with respect to the final mould, and when released to cause relative vertical movement between the intermediate and final moulds.

9. A gravity bending mould according to claim 1, wherein the final mould comprises a second final movable mould section mounted at the other end of the gravity bending mould, the second final movable mould section having an upper shaping surface; the intermediate mould comprises a second movable mould section mounted adjacent to the second final movable mould section and having an upper shaping surface, wherein in the first arrangement the upper shaping surface of the second intermediate movable mould section is higher than the upper shaping surface of the second final movable mould section, and wherein the second final movable mould section is connected via a second mechanical linkage to the intermediate mould, such that upon moving from the first arrangement to the second arrangement the second final movable mould section is caused to move into the closed position.

10. A gravity bending mould according to claim 9, wherein the second final movable mould section moves into the closed position at the same time as the final movable mould section moves into the closed position.

11. A gravity bending mould according to claim 1, wherein the mechanical linkage comprises a link that is rotatable about two pivot axes.

12. A gravity bending mould according to claim 1, wherein the intermediate mould remains closed during the transition of the gravity bending mould from the first arrangement to the second arrangement.

13. A gravity bending mould according to claim 1, wherein the movement of the one of the intermediate mould and the final mould during the transition of the gravity bending mould from the first arrangement to the second arrangement is synchronised with the movement of the final movable mould section into the closed position.

14. A gravity bending mould according to claim 1, wherein the final movable mould section is articulated.

15. A gravity bending mould according to claim 1, wherein the intermediate movable mould section is articulated.

16. A gravity bending mould according to claim 1, wherein the intermediate mould has a smaller curvature than the final mould.

17. A gravity bending mould according to claim 1, wherein the intermediate mould is located inwardly of the final mould.

18. A gravity bending mould according to claim 1, further comprising a linear actuator to assist in closing the final mould.

19. A glass sheet bending apparatus comprising a gravity bending mould according to claim 1, and a die mechanism arranged to move vertically with respect to the gravity bending mould, the die mechanism comprising a male die for shaping an upper surface of a glass sheet supported on the final peripheral shaping rim.

20. A glass sheet bending apparatus comprising a plurality of gravity bending moulds according to claim 1, a furnace, a conveyor system for successively conveying the plurality of gravity bending moulds through the furnace, the furnace including an actuator mechanism provided inside or outside the furnace at a predetermined location along the furnace length, the actuator mechanism being adapted to cause the mould to move from the first arrangement to the second arrangement as each respective gravity bending mould is conveyed past the actuator mechanism.

21. A glass sheet bending apparatus according to claim 20, comprising a die mechanism arranged to move vertically with respect to one of the gravity bending moulds, the die mechanism comprising a male die for shaping an upper surface of a glass sheet supported on the final peripheral shaping rim.

22. A gravity bending mould according to claim 1, wherein, when the gravity bending mould is in the first arrangement, the entire upper shaping surface of the intermediate movable mould section is higher than the upper shaping surface of the final movable mould section.

23. A method of gravity bending a glass sheet, the method comprising the steps of: (a) providing a gravity bending mould comprising a final mould having a final peripheral shaping rim and an intermediate mould having an intermediate peripheral shaping rim; the final mould comprising a final movable mould section mounted at an end of the mould, the final movable mould section having an upper shaping surface; the intermediate mould comprising an intermediate movable mould section mounted at the end of the mould adjacent to the final movable mould section; the intermediate movable mould section having an upper shaping surface; the final movable mould section being connected to the intermediate mould via a mechanical linkage; (b) disposing the intermediate mould in a raised position with respect to the final mould; (c) placing a flat glass sheet on the intermediate mould with the intermediate movable mould section being in a substantially horizontal open position, the flat glass sheet being supported by at least one part of the intermediate movable mould section when the intermediate mould is in an open position; (d) gravity bending the flat glass sheet in a furnace by heating the glass sheet, the heating causing softening of the glass sheet thereby to gravity bend the glass sheet, the gravity bending step comprising two phases, (i) a first phase in which the gravity bending mould is in a first arrangement wherein the intermediate mould is in a closed position and the upper shaping surface of the final movable mould section is below the upper shaping surface of the intermediate movable mould section and in which the flat glass sheet is bent to an intermediate bent shape by the intermediate mould, such that the bent glass sheet is supported on the intermediate peripheral shaping rim, and (ii) a second phase, after the first phase, in which the final movable mould section is disposed in a raised position with respect to the intermediate movable mould section, and glass sheet is bent from the intermediate bent shape to a final bent shape by closing the final mould, such that when the final mould is closed, the gravity bending mould is in a second arrangement with the upper shaping surface of the final movable mould section being higher than the upper shaping surface of the intermediate movable mould section, and in that the bent glass sheet is supported on the final peripheral shaping rim, wherein in going from the first phase to the second phase, one of the intermediate mould and final mould is moved with respect to the other and at the same time, at least one of the intermediate mould and the final mould moves with respect to the mechanical linkage, to cause the final movable mould section to move upwards relative to the intermediate movable mould section, to take the place of the intermediate movable mould section, wherein, when the gravity bending mould is in the first arrangement, the entire upper shaping surface of the intermediate movable mould section is higher than the upper shaping surface of the final movable mould section.

24. A method of gravity bending a glass sheet according to claim 23, wherein the intermediate mould is mounted on a first support frame and the first support frame is mounted on a mould support frame, and in going from the first phase to the second phase, the intermediate mould moves by moving the first support frame relative to the mould support frame.

25. A method of gravity bending a glass sheet according to claim 24, wherein the first support frame is pivotally mounted to the mould support frame by a hinge mechanism having a pivot axis, and in going from the first phase to the second phase, the first support frame rotates about the pivot axis.

26. A method of gravity bending a glass sheet according to claim 23, wherein the movement of the one of the intermediate mould and the final mould is synchronised with the movement of the final movable mould section such that the glass sheet is continually supportable when moving from the first phase to the second phase.

27. A method of bending a glass sheet comprising a gravity bending method according to claim 23, and a die assisted bending step for shaping the glass sheet under the action of an applied force when the glass sheet is supported on the intermediate peripheral shaping rim and/or the final peripheral shaping rim.

28. A method of gravity bending a glass sheet according to claim 23, wherein the upper shaping surface of the intermediate movable mould section is located inwardly or outwardly of the upper shaping surface of the final movable mould section.

29. A gravity bending mould for bending glass sheets comprising: a final mould having a final peripheral shaping rim and an intermediate mould having an intermediate peripheral shaping rim; the final mould comprising a final movable mould section mounted at an end of the gravity bending mould, the final movable mould section having an upper shaping surface; the intermediate mould comprising an intermediate movable mould section mounted at the end of the gravity bending mould adjacent to the final movable section, the intermediate movable mould section having an upper shaping surface;

wherein the gravity bending mould is movable between a first arrangement, wherein the intermediate mould is closed and the upper shaping surface of the intermediate movable mould section is higher than the upper shaping surface of the final movable mould section; and a second arrangement, wherein the final mould is closed and the upper shaping surface of the intermediate movable mould section is lower than the upper shaping surface of the final movable mould section;

wherein the final movable mould section is connected via a mechanical linkage to the intermediate mould such that upon moving one of the intermediate mould and the final mould vertically with respect to the other, and at the same time at least one of the intermediate mould and the final mould moves with respect to the mechanical linkage, the gravity bending mould is caused to move between the first arrangement and the second arrangement;

wherein the upper shaping surface of the intermediate movable mould section is located inwardly or outwardly of the upper shaping surface of the final movable mould section; and wherein, when the gravity bending mould is in the first arrangement, the entire upper shaping surface of the intermediate movable mould section is higher than the upper shaping surface of the final movable mould section.

30. A method of gravity bending a glass sheet, the method comprising the steps of: (a) providing a gravity bending mould comprising a final mould having a final peripheral shaping rim and an intermediate mould having an intermediate peripheral shaping rim; the final mould comprising a final movable mould section mounted at an end of the mould, the final movable mould section having an upper shaping surface; the intermediate mould comprising an intermediate movable mould section mounted at the end of the mould adjacent to the final movable mould section; the intermediate movable mould section having an upper shaping surface; the final movable mould section being connected to the intermediate mould via a mechanical linkage; (b) disposing the intermediate mould in a raised position with respect to the final mould; (c) placing a flat glass sheet on the intermediate mould with the intermediate movable mould section being in a substantially horizontal open position, the flat glass sheet being supported by at least one part of the intermediate movable mould section when the intermediate mould is in an open position; (d) gravity bending the flat glass sheet in a furnace by heating the glass sheet, the heating causing softening of the glass sheet thereby to gravity bend the glass sheet, the gravity bending step comprising two phases, (i) a first phase in which the gravity bending mould is in a first arrangement wherein the intermediate mould is in a closed position and the upper shaping surface of the final movable mould section is below the upper shaping surface of the intermediate movable mould section and in which the flat glass sheet is bent to an intermediate bent shape by the intermediate mould, such that the bent glass sheet is supported on the intermediate peripheral shaping rim, and (ii) a second phase, after the first phase, in which the final movable mould section is disposed in a raised position with respect to the intermediate movable mould section, and glass sheet is bent from the intermediate bent shape to a final bent shape by closing the final mould, such that when the final mould is closed, the gravity bending mould is in a second arrangement with the upper shaping surface of the final movable mould section being higher than the upper shaping surface of the intermediate movable mould section, and in that the bent glass sheet is supported on the final peripheral shaping rim, wherein in going from the first phase to the second phase, one of the intermediate mould and final mould is moved with respect to the other and at the same time, at least one of the intermediate mould and the final mould moves with respect to the mechanical linkage, to cause the final movable mould section to move upwards relative to the intermediate movable mould section, to take the place of the intermediate movable mould section, wherein the entire upper shaping surface of the intermediate movable mould section is located inwardly or outwardly of the upper shaping surface of the final movable mould section.

31. A method of gravity bending a glass sheet according to claim 30, wherein, when the gravity bending mould is in the first arrangement, the entire upper shaping surface of the intermediate movable mould section is higher than the upper shaping surface of the final movable mould section.

* * * * *